(12) United States Patent
Brilmaker

(10) Patent No.: US 6,482,245 B2
(45) Date of Patent: Nov. 19, 2002

(54) CENTRIFUGAL PARTICULATE MATTER GAS SEPARATOR

(75) Inventor: Stephane Brilmaker, Tilff (BE)

(73) Assignee: Armstrong International, Stuart, FL (US)

(*) Notice: Subject to any disclaimer, the term of this patent is extended or adjusted under 35 U.S.C. 154(b) by 0 days.

(21) Appl. No.: 09/821,980

(22) Filed: Mar. 30, 2001

(65) Prior Publication Data

US 2002/0139097 A1 Oct. 3, 2002

(51) Int. Cl.⁷ ............................................. B01D 45/12
(52) U.S. Cl. ........................................... 55/394; 55/457
(58) Field of Search ..................... 55/394, 456, 457, 55/406, 404, 405, DIG. 23

(56) References Cited

U.S. PATENT DOCUMENTS

| | | |
|---|---|---|
| 3,216,182 A | 11/1965 | Cochran et al. |
| 3,296,779 A | 1/1967 | Daman et al. |
| 3,329,130 A | 7/1967 | Cochran |
| 3,795,244 A | 3/1974 | Lax et al. |
| 3,868,236 A | 2/1975 | Meier et al. |
| 3,885,934 A | 5/1975 | Eads et al. |
| 3,887,342 A | 6/1975 | Bunnelle |
| 3,923,483 A | 12/1975 | Hilmer et al. |
| 3,961,923 A | 6/1976 | Rouhani |
| 4,015,960 A | 4/1977 | Nutter |
| 4,076,508 A * | 2/1978 | Christensen ............... 55/309 |
| 4,089,665 A * | 5/1978 | Brookman ................ 55/457 |
| 4,245,710 A | 1/1981 | Dolezal et al. |
| 4,255,174 A | 3/1981 | Simpson |
| 4,629,481 A | 12/1986 | Echols |
| 5,061,304 A | 10/1991 | Gorzegno et al. |
| 5,129,930 A | 7/1992 | Gauthier et al. |
| 5,466,272 A | 11/1995 | Karlsson et al. |
| 5,853,443 A | 12/1998 | Rodgers et al. |
| 5,875,774 A | 3/1999 | Clementi et al. |
| 5,942,163 A | 8/1999 | Robinson et al. |

FOREIGN PATENT DOCUMENTS

| | | |
|---|---|---|
| CH | 670 204 A5 | 5/1989 |
| DE | 0 646 380 A1 | 1/1993 |
| EP | 0 438 251 A1 | 7/1991 |
| EP | WO 98/43721 | 10/1998 |
| FR | 2541587 | 2/1984 |

OTHER PUBLICATIONS

Armstrong International, Bulletin No. 504–H, 30M, May 1994, pp. 13, 14, 15, 16, 17, 21, 23, and 24.

* cited by examiner

Primary Examiner—Robert A. Hopkins
(74) Attorney, Agent, or Firm—MacMillan, Sobanski & Todd, LLC

(57) ABSTRACT

A device for separating a gas from a flow of the gas and particulate matter. The device has a chamber defined by a receiving surface. The device has a gas inlet conduit and a gas outlet conduit. The gas inlet conduit is positioned to deliver the flow of the gas and the particulate matter to the chamber. The gas outlet conduit is positioned to exhaust the flow of the gas from the chamber. The device includes a stationary impeller positioned within the chamber and having an upstream surface and a downstream surface. The impeller is configured to deflect the flow of the particulate matter and the gas to a radially outward flow of the particulate matter and the gas in a direction toward the receiving surface of the chamber. The device includes a gas exhaust port positioned in the gas outlet conduit and downstream of the gas inlet conduit and the impeller.

32 Claims, 5 Drawing Sheets

CENTRIFUGAL PARTICULATE MATTER GAS SEPARATOR

TECHNICAL FIELD

This invention relates to a device for separating a gas from a particulate matter. More specifically, this invention relates to a device for separating a gas from a liquid or a solid.

BACKGROUND OF THE INVENTION

The need for a controlled supply of humidified air in medical and other applications is well documented. For example, a controlled supply of humidified air is needed to maintain a clean room in a hospital. Temperature, air pressure, and humidity conditions must be maintained precisely to maintain a pristine clean room. Problems associated with excessively dry air are well documented. The need to provide and maintain clean rooms is well known in the medical profession. Similarly, the importance of clean rooms is known to be critical in semiconductor chip fabrication operations as well as in the manufacture of chemical, pharmaceutical, and other products.

Typically, building humidification systems are centrally located large scale units which generate large quantities of steam to humidify various portions of the building. These large scale units are typically positioned at locations which are remote from the areas of the building to be humidified. Air ducts and other pipes are required to carry the steam or water vapor from the remote locations to the area to be humidified. Typically, steam is introduced into the building air at desired locations by means of steam humidifiers placed in air ducts. Humidity detectors are generally used with humidifiers to modulate the amount of steam being introduced.

The controlled supply of humidified air preferably does not contain excess liquid. Steam cools and condenses into water as it travels to the area to be humidified. Unfortunately, the liquid can then be delivered with the humidified air and can collect in air ducts and dampen sensitive portions of the area to be humidified, and objects located therein. In general, separators are useful to remove excess liquid from gases, and more particularly separators are useful for removing condensed steam, or water, from a flow of steam to produce dry steam. The conventional separators are often designed with high body volume and therefore low speed steam and water flows. Such separators can be bulky, relatively cumbersome to manufacture and use. The separators typically have a large mass and may receive a heat transfer from its surrounding environment. It would thus be desirable to provide a smaller separator.

SUMMARY OF THE INVENTION

The above objects as well as other objects not specifically enumerated are achieved by a device for separating a gas from a flow of the gas and particulate matter. The device has a chamber defined by a receiving surface. The device has a gas inlet conduit and a gas outlet conduit. The gas inlet conduit is positioned to deliver the flow of the gas and the particulate matter to the chamber. The gas outlet conduit is positioned to exhaust the flow of the gas from the chamber. The device includes a stationary impeller positioned within the chamber and having an upstream surface and a downstream surface. The impeller is configured to deflect the flow of the particulate matter and the gas to a radially outward flow of the particulate matter and the gas in a direction toward the receiving surface of the chamber. The device includes a gas exhaust port positioned in the gas outlet conduit and downstream of the gas inlet conduit and the impeller.

According to this invention, there is provided a device for separating a gas from a flow of the gas and particulate matter. The device has a chamber defined by a receiving surface. The device has a gas inlet conduit and a gas outlet conduit. The gas inlet conduit is positioned to deliver the flow of the gas and the particulate matter to the chamber. The gas outlet conduit is positioned to exhaust the flow of the gas from the chamber. The device includes an impeller positioned within the chamber and having an upstream surface and a downstream surface. The impeller is configured to deflect the flow of the particulate matter and the gas to a radially outward flow of the particulate matter and the gas in a direction toward the receiving surface of the chamber. The impeller has a central portion positioned generally in the center of the impeller. The device includes a gas exhaust port positioned in the gas outlet conduit and downstream of the gas inlet conduit and the impeller. The gas inlet conduit has a major cross-sectional dimension and the central portion of the impeller has a major cross-sectional dimension at least approximately as large as the major cross-sectional dimension of the gas inlet conduit.

According to this invention, there is also provided a device for separating a gas from a flow of the gas and particulate matter. The device has a chamber defined by a receiving surface. The device has a gas inlet conduit and a gas outlet conduit. The gas inlet conduit is positioned to deliver the flow of the gas and the particulate matter to the chamber. The gas outlet conduit is positioned to exhaust the flow of the gas from the chamber. The device has a means for imparting centrifugal motion to the particulate matter. The device includes an impeller positioned within the chamber and having an upstream surface and a downstream surface. The impeller is configured to deflect the flow of the particulate matter and the gas to a radially outward flow of the particulate matter and the gas in a direction toward the receiving surface of the chamber. The impeller has a central portion. The device includes a gas exhaust port positioned in the gas outlet conduit and downstream of the gas inlet conduit and the impeller.

According to this invention, there is also provided a device for separating a gas from a flow of the gas and particulate matter. The device has a chamber defined by a receiving surface. The device has a gas inlet conduit and a gas outlet conduit. The gas inlet conduit is positioned to deliver the flow of the gas and the particulate matter to the chamber. The gas outlet conduit is positioned to exhaust the flow of the gas from the chamber. The device includes an impeller positioned within the chamber and having an upstream surface and a downstream surface. The impeller is configured to deflect the flow of the particulate matter and the gas to a radially outward flow of the particulate matter and the gas in a direction toward the receiving surface of the chamber. The device includes a gas exhaust port positioned in the gas outlet conduit and downstream of the gas inlet conduit and the impeller. The gas inlet conduit includes a major cross-sectional dimension. The chamber has a volume. The ratio of the major cross-sectional dimension cubed to the volume of the chamber is within the range of from about 1:3 to about 1:14. The gas exhaust port has a major cross-sectional dimension. The gas exhaust port is spaced apart from the downstream surface of the impeller by a distance of less than about one major cross-sectional dimension.

According to this invention, there is also provided a device for separating a gas from a flow of the gas and particulate matter. The device has a chamber defined by a receiving surface. The device includes an impeller positioned within the chamber and having an upstream surface and a downstream surface. The impeller is configured to deflect the flow of the particulate matter and the gas to a radially outward flow of the particulate matter and the gas in a direction toward the receiving surface of the chamber. The device includes a gas exhaust port positioned in the gas outlet conduit and downstream of the gas inlet conduit and the impeller. The gas inlet conduit includes a major cross-sectional dimension and the gas inlet conduit has a longitudinal axis. The chamber has a length in a direction along the longitudinal axis of the gas inlet conduit. The ratio of the major cross-sectional dimension of the gas inlet conduit to the length of the chamber is within the range of from about 2:1 to about 1:3.

According to this invention, there is also provided a device for separating a gas from a flow of the gas and particulate matter. The device has a chamber defined by a receiving surface. The device has a gas inlet conduit and a gas outlet conduit. The gas inlet conduit is positioned to deliver the flow of the gas and the particulate matter to the chamber. The gas outlet conduit is positioned to exhaust the flow of the gas from the chamber. The device includes an impeller positioned within the chamber and having an upstream surface and a downstream surface. The impeller is configured to deflect the flow of the particulate matter and the gas to a radially outward flow of the particulate matter and the gas in a direction toward the receiving surface of the chamber. The device includes a gas exhaust port positioned in the gas outlet conduit and downstream of the gas inlet conduit and the impeller. The gas exhaust port has a major cross-sectional dimension. The gas exhaust port is spaced apart from the downstream surface of the impeller by a distance of less than about one major cross-sectional dimension.

Various objects and advantages of this invention will become apparent to those skilled in the art from the following detailed description of the preferred embodiment, when read in light of the accompanying drawings.

DETAILED DESCRIPTION OF THE INVENTION

Figure 1:
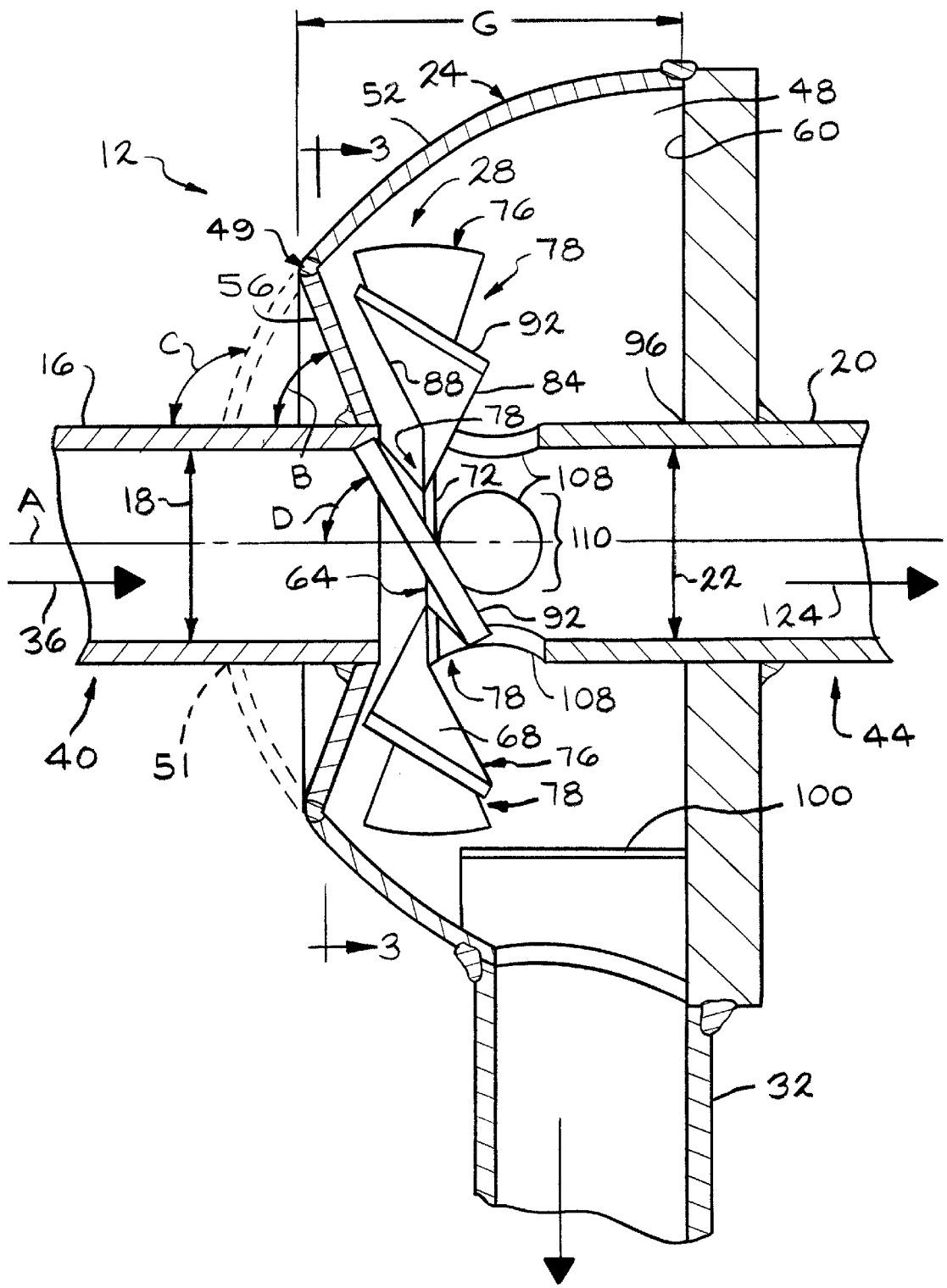
FIG. 1 is an elevational schematic view in cross-section illustrating a separator according to the invention.
Figure 2:
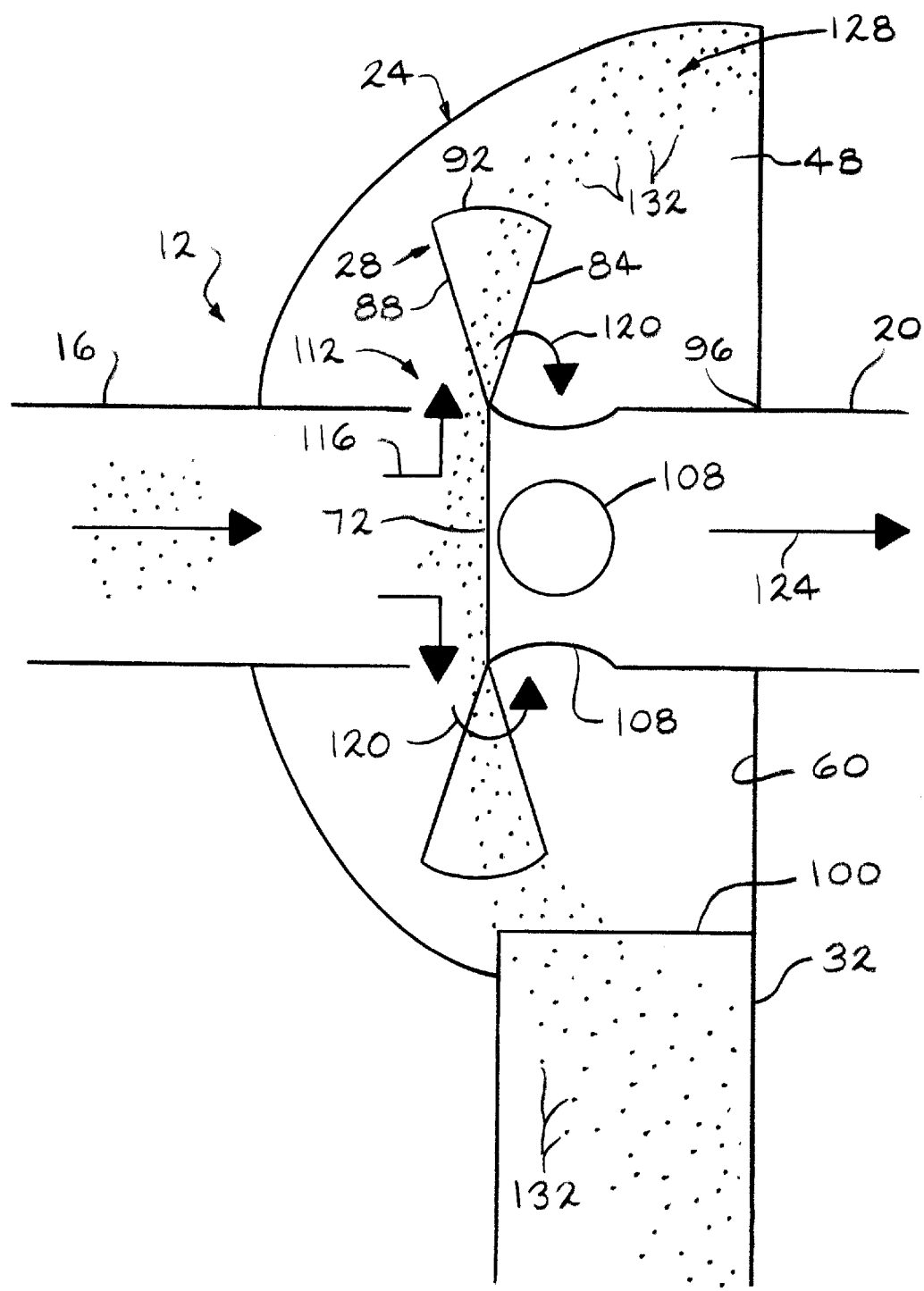
FIG. 2 is an elevational schematic view in cross-section of the separator of FIG. 1 showing flow paths of the particulate matter and the gas.
Figure 3:
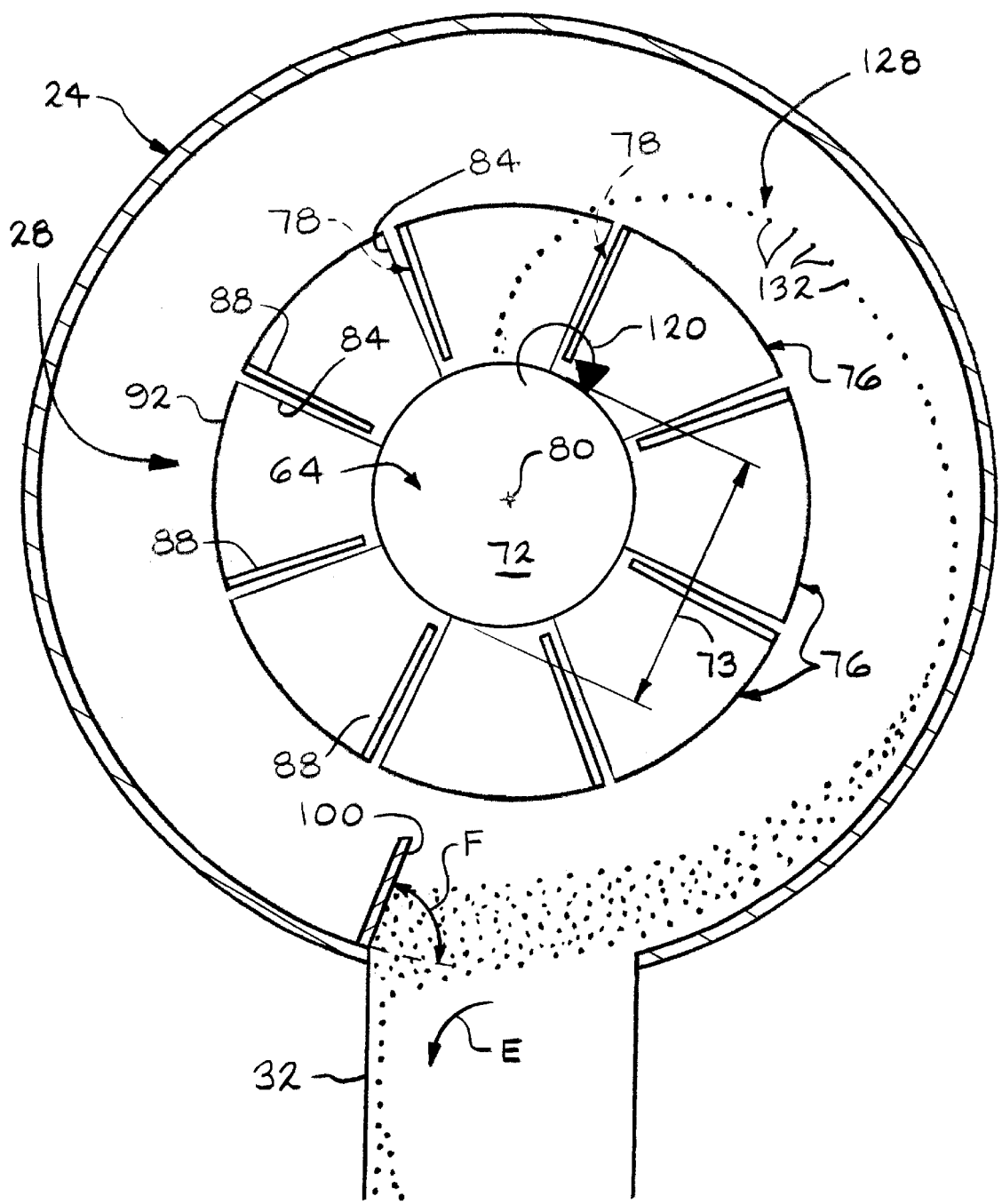
FIG. 3 is a plan schematic view in cross-section of the separator of FIG. 1 viewed along line 3—3 with portions removed for clarity.

Referring now to FIGS. 1 through 3, the description and drawings disclose a separator according to the invention, indicated generally at 12. The separator 12 is generally operative to separate a flow mixture containing a gas and a particulate matter. The particulate matter can be a liquid or a solid. The separator 12 preferably includes a gas inlet conduit 16 and a gas outlet conduit 20 fixed to a body 24, an impeller 28 positioned in the body 24, and a drain 32 to remove the liquid.

The separator 12 can be used in many ways. In this application, the separator 12 will be discussed in the context of being used to separate a gas from a liquid that is entrained in the flow of the gas. It should be understood that the separator 12 can be used to separate a gas from an entrained solid or to separate a liquid such as water from steam. The liquid and the solid are nonlimiting examples of types of particulate matter that can be separated from the gas by the separator 12. Other nonlimiting examples of uses for the separator 12 include humidification systems, heat exchangers, and other devices where dry steam is desired.

The gas inlet conduit 16 and the gas outlet conduit 20 are preferably oriented coaxial along a generally longitudinal axis "A." The axis "A" is preferably a generally horizontal axis (as shown in FIG. 1), though it may be a generally vertical axis. The gas inlet conduit 16 and the gas outlet conduit 20 preferably have a generally round cross-sectional shape, although it may have any suitable cross-sectional shape. The gas inlet conduit 16 includes a major cross-sectional dimension 18. The major cross-sectional dimension 18 is understood to be the largest chord that can be drawn on a cross-section of the gas inlet conduit 16. When the gas inlet conduit 16 has a round cross-sectional shape, the major cross-sectional dimension 18 is a diameter of the gas inlet conduit 16. The gas outlet conduit 20 includes a major cross-sectional dimension 22. The major cross-sectional dimension 22 is understood to be the largest chord that can be drawn on a cross-section of the gas outlet conduit 20. When the gas outlet conduit 20 has a round cross-sectional shape, the major cross-sectional dimension 22 is a diameter of the gas outlet conduit 20. The mixture of the gas and the liquid travels through the gas inlet conduit 16, toward the impeller 28 as indicated by arrow 36. The mixture enters at an inlet end 40 of the separator 12 and is separated into the gas which exits at an outlet end 44 of the separator 12 and the liquid which exits at the drain 32 of the separator 12.

The body 24 defines a chamber 48. The body 24 preferably includes a curved portion 52 which terminates proximate the inlet end 40 at an optional support wall 56, and proximate the outlet end 44 at an optional outlet wall 60. The chamber 48 may be any suitable shape. Nonlimiting examples of suitable shapes for the chamber 48 include generally cylindrical shapes, generally conical shapes, and generally spherical shapes and the like. The curved portion 52 is a particulate matter receiving surface for the particulate matter traveling radially outwardly from the impeller 28. It will thus be appreciated that the curved portion 52 is a liquid receiving surface for liquid traveling radially outwardly from the impeller 28.

The chamber 48 has a volume that can be calculated in a manner known in the art. In a preferred embodiment, the ratio of the major cross-sectional dimension 18 cubed to the volume of the chamber 48 is within the range of from about 1:3 to about 1:14, more preferably within the range of from about 1:5 to about 1:10. The ratio is preferably achieved when the chamber 48 is generally cylindrical. The chamber 48 also has a length "G" in a direction along the axis "A" of the gas inlet conduit. The length "G" of the chamber 48 is measured from about a rearward most part 49 of the body 24 to about the outlet wall 60. The rearward most part 49 of the body 24 may also be located at other positions on the body 24, such as the position indicated generally at 51. In a preferred embodiment, the ratio of the major cross-sectional dimension 18 of the gas inlet conduit 16 to the length "G" of the chamber 48 is within the range of from about 2:1 to about 1:4 more preferably within the range of from about 1:1 to about 1:3.

The support wall 56 is preferably fixed to the curved portion 52 and the gas inlet conduit 16. The support wall 56 forms an angle "B" with the gas inlet conduit 16. The angle "B" is a first angle. The angle "B" may be any suitable angle and is preferably an angle within the range of from about 45 degrees to about 80 degrees, more preferably about 75 degrees. The angle "B" is desirably proportional to the angle "D." When the support wall 56 is not employed, the curved portion 52 of the body 24 is fixed to the gas inlet conduit 16. When the support wall 56 is not employed, the curved portion 52 then forms an angle "C" with the gas inlet conduit 16. The angle "C" may be any suitable angle and is shown as an angle of about 105 degrees. The support wall 56 is useful to eliminate "dead space" within the chamber 48 that is otherwise present proximate the junction of the gas inlet conduit 16 and the curved portion 52. It will be appreciated that the support wall 56 is therefore operative to reduce turbulence in the chamber 48 proximate the gas inlet conduit 16.

As the mixture of the gas and the liquid flows through the gas inlet conduit 16, it strikes the impeller 28. The impeller 28 has an inlet contact surface 64 on one side and an outlet surface 68 on the other side. The inlet contact surface 64 is an upstream surface with respect to the outlet surface 68, and generally faces the inlet end 40 of the separator 12. The outlet surface 68 of the impeller 28 is a downstream surface with respect to the inlet contact surface 64, and generally faces the outlet end 44 of the separator 12.

Figure 5:
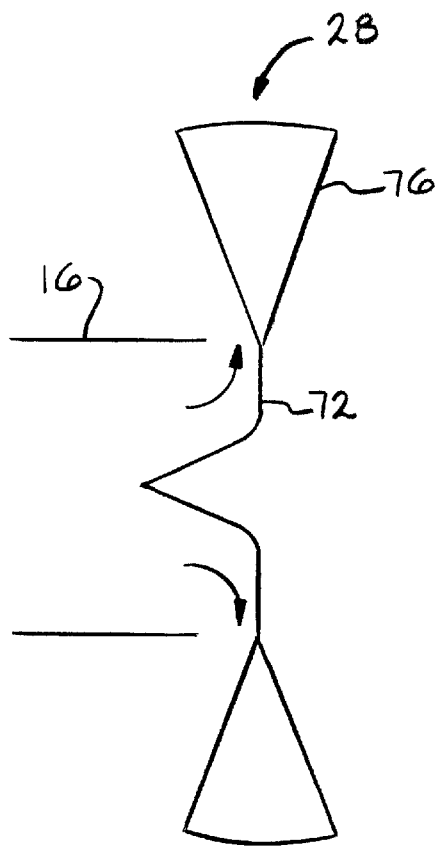
FIG. 5 is an alternate embodiment of the impeller of the invention.
Figure 6:
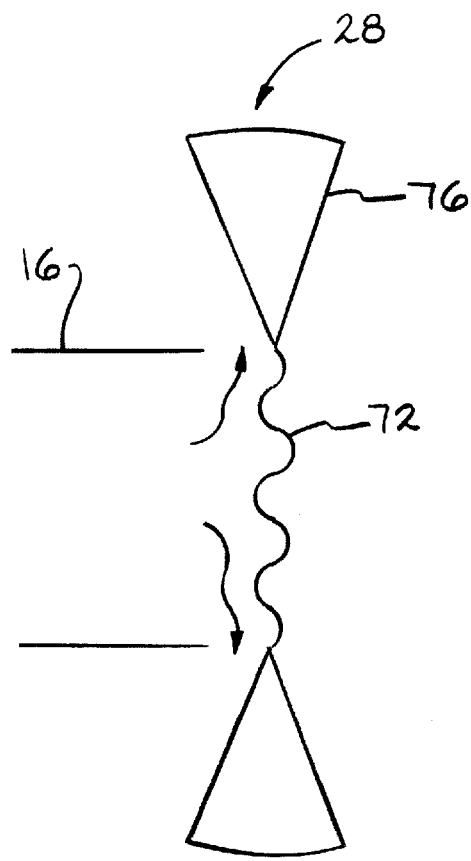
FIG. 6 is another embodiment of the impeller of the invention.

The impeller 28 preferably includes a central portion 72 and one or more blades 76. The impeller 28 is a deflector. The term "impeller" here is understood to include a mobile or stationary member for transmitting motion to the gas and/or the liquid. The central portion 72 is preferably generally round and preferably generally flat, although it may have any suitable shape. As shown in FIGS. 5 and 6, the central portion 72 need not be flat. The central portion 72 shown for the impeller 28 in FIG. 5 is generally conical in shape. The central portion 72 shown for the impeller 28 in FIG. 5 is irregularly shaped. It will be appreciated that the central portion 72 of the impeller 28 may be curved. The central portion 72 is preferably positioned generally in the center of the impeller 28. A center point 80 of the impeller 28 is preferably positioned so as to coincide with the axis "A."

The central portion 72 preferably has a major cross-sectional dimension 73 (best seen in FIG. 3). The major cross-sectional dimension 73 is understood to be the largest chord that can be drawn on the central portion 72. When the central portion 72 has a round shape, the major cross-sectional dimension 73 is a diameter of the central portion 72. The central portion 72 preferably has a major cross-sectional dimension 73 at least about as large as the major cross-sectional dimension 18 of the gas inlet conduit 16.

The illustrated impeller 28 includes eight blades 76, though it may include any suitable number of blades 76. The blades 76 project radially outwardly from the center point 80 of the impeller 28. The blades 76 preferably include a leading edge 84, a trailing edge 88, and a radially outer edge 92. The radially outer edge 92 of the blades 76 forms an angle "D" with the axis. "A," as shown in FIG. 1. The angle "D" may be any suitable angle and is preferably an angle of within the range of from about 45 degrees to about 80 degrees, and more preferably about 60 degrees. In a preferred embodiment, the support wall 56 generally follows the contour of the blades 76 and vice versa.

The blades 76 are preferably separated by slits which define gas escape openings 78. In a preferred embodiment, the number of gas escape openings 78 is equal to the number of blades 76. Substantially all of the gas in the mixture from the gas inlet conduit 16 travels through the impeller 28 through the gas escape openings 78. The term "substantially all" in this context means a percentage that is greater than about 80 percent.

The outlet wall 60 is preferably a generally round flat plate. The illustrated outlet wall 60 has a hole 96 positioned approximately in the middle of the outlet wall 60. For the illustrated separator 12, the outlet wall 60 preferably has a diameter that exceeds the major cross-sectional dimension 22 of the gas outlet conduit 20. The outlet wall 60 is preferably positioned about perpendicular to the gas inlet conduit 16 and the gas outlet conduit 20, and about parallel to the central portion 72 of the impeller 28. The illustrated outlet wall 60 is fixed to the perimeter of the gas outlet conduit 20 at the hole 96 in the outlet wall 60. The illustrated outlet wall 60 is preferably fixed to the curved portion 52 of the body 24 at about the perimeter of the curved portion 52. The illustrated outlet wall 60 is also preferably fixed to the drain 32.

The outlet wall 60 also supports a deflector 100 fixed thereto. The deflector 100 is preferably a generally curved plate, though may be any suitable shape including generally flat. The deflector 100 is preferably located proximate the drain 32, and is operative to intercept the liquid traveling along the curved portion 52 and to promote transport of the liquid through the drain 32, as generally indicated by the arrow "E." The deflector 100 is also preferably fixed to the curved portion 52 of the body 24. The deflector 100 is preferably oriented at an angle "F" (best seen in FIG. 3) with respect to the perimeter of the outlet wall 60. The angle "F" may be any suitable angle, although it is preferably an angle within the range of from about 5 degrees to about 85 degrees with respect to the perimeter of the outlet wall 60.

A gas exhaust port 108 is provided in the gas outlet conduit 20. The gas exhaust port 108 is downstream of the gas inlet conduit 16 and the impeller 28. The gas exhaust port 108 is operative to receive the gas supplied from the gas inlet conduit 16, preferably substantially all of the gas. The term "substantially all" in this context means a percentage that is greater than about 80 percent. The gas exhaust port 108 may be placed at any suitable location on the gas outlet conduit 20, although it is desirably placed immediately downstream of the impeller 28. The gas exhaust port 108 is preferably round, although it may have any suitable shape. The gas exhaust port 108 includes a major cross-sectional dimension 110. The major cross-sectional dimension 110 is understood to be the largest chord that can be drawn on the exhaust port 108. When the gas exhaust port 108 is round, the major cross-sectional dimension 110 is a diameter of the gas exhaust port 108. The gas exhaust port 108 may have any suitable major cross-sectional dimension 110, though preferably has a major cross-sectional dimension 110 less than the major cross-sectional dimension 18 of the gas outlet conduit 20.

The gas outlet conduit 20 for the illustrated separator 12 includes four gas exhaust ports 108, three being illustrated in FIG. 1, though any suitable number may be employed. When more than one gas exhaust port 108 is used, they are preferably spaced approximately equidistant from each other and positioned around the circumference of the gas outlet conduit 20. Preferably, the gas exhaust ports 108 are arranged so that one of them is oriented at the lowest point for drainage of condensation when the separator 12 is not operating. It should be noted that the major cross-sectional dimension 110 of the gas exhaust port 108 is preferably inversely proportional to the quantity of the gas exhaust ports 108 employed. In a preferred embodiment, the gas exhaust port 108 is spaced apart from the outlet surface 68 of the impeller 28 by a distance of less than about one major cross-sectional dimension 110 from the portion of the perimeter of the gas exhaust port 108 nearest the outlet surface 68 of the impeller 28. For the separator 12 shown in FIG. 1, the distance between the portion of the perimeter of the gas exhaust port 108 nearest the outlet surface 68 of the impeller 28 is about zero.

As shown in FIGS. 2 and 3, a gas flow path for the separator 12 is generally indicated at 112. The gas inlet conduit 16 and the gas exhaust port 108 partially define the gas flow path 112. The mixture, which contains the gas and the liquid, from the gas inlet conduit 16 strikes the impeller 28, preferably at the central portion 72. The incoming gas and liquid from the gas inlet conduit 16 change direction about 90 degrees by impinging on the impeller 28, as indicated by the arrow 116. The gas then changes direction about 180 degrees as indicated by the arrow 120 as the gas flows through the gas escape openings 78, between the blades 76. The gas then flows into the gas exhaust port 108. The gas then flows into the gas outlet conduit 20 and through the outlet end 44 of the separator 12, as indicated by the arrow 124.

As shown in FIGS. 2 and 3, a liquid flow path 128 for liquid droplets 132 in the separator 12 is indicated at 112. The mixture, which contains the gas and the liquid, from the gas inlet conduit 16 strikes the impeller 28, preferably at the central portion 72. For purposes of clarity, the liquid flow path 128 will be discussed in terms of movement of liquid droplets, indicated generally at 132. The mixture contains liquid droplets 132. The liquid droplets 132 change direction and move along the blades 76. Movement of the liquid droplets 132 along the blades 76 is facilitated by the blades 76 being oriented at the angle "D." The liquid droplets 132 preferably move along the surface of the blades 76, and in a generally spiral path. The liquid droplets 132 then preferably contact the body 24, flow along the curved portion 52 until intercepted by the deflector 100, and exit the separator 12 through the drain 32, as generally indicated by the arrow "E".

The impeller 28 includes a means for imparting centrifugal motion to the liquid. As shown in FIG. 1, the blades 76 of the impeller 28 are used as the means for imparting centrifugal motion to the liquid. Likewise, one or more baffles (not shown), jets (not shown) scoops (not shown), deflectors (not shown), and the like may also be employed as means for imparting centrifugal motion to the liquid.

In operation, substantially all of the liquid in the mixture from the gas inlet conduit 16 is separated from substantially all of the gas in the mixture from the gas inlet conduit 16. Substantially all of the liquid moves from the gas inlet conduit 16 to the drain 32 after striking the impeller 28. Substantially all of the gas moves from the gas inlet conduit 16 to the gas outlet conduit 20 and out of the separator 12. The term "substantially all" in these contexts mean a percentage that is greater than about 80 percent.

Alternate embodiments of the separator 12 are contemplated. The gas inlet conduit 16 and the gas outlet conduit 20 need not be provided along a linear axis. The gas inlet conduit 16 and the gas outlet conduit 20 may be oriented at any suitable angle with respect to each other. As the position of the gas inlet conduit 16 and the gas outlet conduit 20 change, it should be understood that the gas flow path 112 may be altered. The gas flow path 112 may also vary from the one illustrated if the relative orientations of the impeller 28 or the gas exhaust port 108 are altered. Likewise, the liquid flow path 128 may vary from the one disclosed if the relative orientations of the gas inlet conduit 16, the impeller 28, the blades 76, or the drain 32 are altered.

Figure 4:
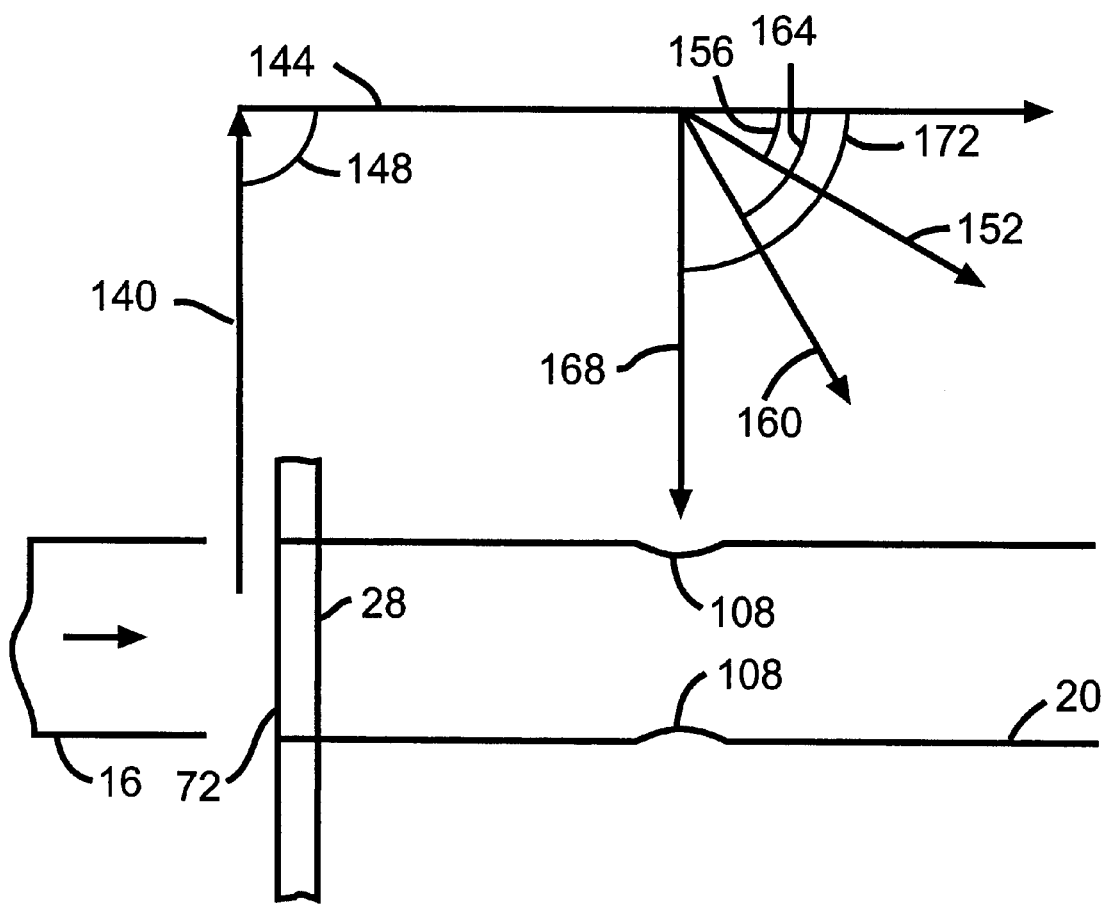
FIG. 4 is a schematic diagram showing the gas flow angles associated with various gas flow paths according to the invention.

Referring now primarily to FIG. 4, the gas from the mixture preferably flows along the gas flow paths as indicated by the illustrated arrows. The arrow 140 indicates the radially outward direction the gas flows after the mixture contacts the central portion 72 of the impeller 28. The arrow 140 indicates an initial radially outward flow. The arrow 144 indicates the direction the gas flows toward the outlet end 44 (shown in FIG. 1) of the separator 12. The angle 148 between the arrow 140 and the arrow 144 is preferably about 90 degrees. The arrow 152 indicates one possible direction the gas may flow. The angle 156 between the arrow 144 and the arrow 152 shows another angle which is about 30 degrees. The arrow 160 indicates a different direction the gas may flow. The angle 164 between the arrow 144 and the arrow 160 is about 45 degrees. The arrow 168 indicates the preferred direction of the gas flow.

The arrows 140 through 168 define several possible gas flow path angles. The gas exhaust port 108 of the gas outlet conduit 20 is preferably positioned with respect to the impeller 28 so as to receive the gas as it flows along the gas flow paths as defined by the arrows 140, 144 and 152, 160 or 168. It will thus be appreciated that the gas inlet conduit 16 and the gas exhaust port 108 define a gas flow path for the gas that includes a gas flow path angle within the range of from about 120 degrees to about 180 degrees when comparing the direction 140, the initial radially outward flow, with the direction 152, 160 or 168.

The term "fixed" as used in this application means to have two structures connected by any suitable mechanical, chemical, or electrical means. Nonlimiting examples of fixation means include welds, adhesives, bolts, fasteners, clamps, and the like. The separator 12 may be made of any suitable material. Metal, particularly non-corrosive metal, is a preferred material when the separator 12 is used with steam.

The principle and mode of operation of this invention have been described in its preferred embodiments. However, it should be noted that this invention may be practiced otherwise than as specifically illustrated and described without departing from its scope.

What is claimed is:

1. A device for separating a gas from a flow of the gas and particulate matter comprising:

a chamber defined by a receiving surface;

a gas inlet conduit and a gas outlet conduit, the gas inlet conduit being positioned to deliver the flow of the gas and the particulate matter to the chamber, the gas outlet conduit being positioned to exhaust the flow of the gas from the chamber;

an impeller positioned within the chamber and having an upstream surface and a downstream surface, the impeller being configured to deflect the flow of the particulate matter and the gas to a radially outward flow of the particulate matter and the gas in a direction toward the receiving surface of the chamber, and the impeller having a central portion positioned generally in the center of the impeller; and a gas exhaust port positioned in the gas outlet conduit and downstream of the gas inlet conduit and the impeller, wherein the gas inlet conduit has a major cross-sectional dimension and the central portion of the impeller has a major cross-sectional dimension at least approximately as large as the major cross-sectional dimension of the gas inlet conduit.

2. The device of claim 1 wherein the receiving surface includes a support wall oriented at a first angle with respect to the impeller, wherein the first angle is within the range of from about 45 degrees to about 80 degrees.

3. The device of claim 2 wherein the first angle is about 75 degrees.

4. The device of claim 1 wherein the gas inlet conduit has a longitudinal axis and the central portion of the impeller is positioned approximately perpendicular to the longitudinal axis of the gas inlet conduit.

5. The device of claim 1 wherein the gas inlet conduit and the gas exhaust port define a gas flow path for the gas that includes a gas flow path angle within the range of from about 120 degrees to about 180 degrees with respect to an initial radially outward flow.

6. The device of claim 1 wherein the gas inlet conduit includes a major cross-sectional dimension and the chamber has a volume, and the ratio of the major cross-sectional dimension cubed to the volume of the chamber is within the range of from about 1:3 to about 1:14.

7. A device for separating a gas from a flow of the gas and particulate matter comprising:

a chamber defined by a receiving surface, the receiving surface including a deflector mounted to intercept the particulate matter;

a gas inlet conduit and a gas outlet conduit, the gas inlet conduit being positioned to deliver the flow of the gas and the particulate matter to the chamber, the gas outlet conduit being positioned to exhaust the flow of the gas from the chamber;

a means for imparting centrifugal motion to the particulate matter; and a gas exhaust port positioned in the gas outlet conduit and downstream of the gas inlet conduit and the impeller.

8. The device of claim 7 wherein the means for imparting centrifugal motion to the particulate matter is an impeller positioned within the chamber and having an upstream surface and a downstream surface, the impeller being configured to deflect the flow of the particulate matter and the gas to a radially outward flow of the particulate matter and the gas in a direction toward the receiving surface of the chamber, and the impeller having a central portion.

9. The device of claim 8 wherein the impeller has blades and the means for imparting centrifugal motion to the particulate matter is the blades.

10. The device of claim 7 further comprising an outlet wall having a perimeter, wherein the outlet wall is connected to the receiving surface and the deflector is positioned at an angle of within the range of from about 5 degrees to about 85 degrees with respect to the perimeter of the outlet wall.

11. The device of claim 10 wherein the receiving surface includes a support wall oriented at a first angle with respect to the impeller, wherein the first angle is within the range of from about 45 degrees to about 80 degrees.

12. The device of claim 11 wherein the first angle is about 75 degrees.

13. The device of claim 8 wherein the gas inlet conduit has a longitudinal axis and the central portion of the impeller is positioned approximately perpendicular to the longitudinal axis of the gas inlet conduit.

14. The device of claim 8 wherein the central portion has a major cross-sectional dimension and the gas inlet conduit has a major cross-sectional dimension and the major cross-sectional dimension of the central portion is at least approximately as large as the major cross-sectional dimension of the gas inlet conduit.

15. The device of claim 8 wherein the gas inlet conduit and the gas exhaust port define a gas flow path for the gas that includes a gas flow path angle within the range of from about 120 degrees to about 180 degrees with respect to an initial radially outward flow.

16. The device of claim 8 wherein the gas inlet conduit includes a major cross-sectional dimension and the chamber has a volume, and the ratio of the major cross-sectional dimension cubed to the volume of the chamber is within the range of from about 1:3 to about 1:14.

17. The device of claim 16 wherein the gas exhaust port has a major cross-sectional dimension and the gas exhaust port is spaced apart from the downstream surface of the impeller by a distance of less than about one major cross-sectional dimension.

18. The device of claim 16 wherein the gas inlet conduit and the gas exhaust port define a gas flow path for the gas that includes a gas flow path angle within the range of from about 120 degrees to about 180 degrees with respect to an initial radially outward flow.

19. The device of claim 16 wherein the gas inlet conduit has a major cross-sectional dimension and the central portion of the impeller has a major cross-sectional dimension at least approximately as large as the major cross-sectional dimension of the gas inlet conduit.

20. The device of claim 8 wherein the gas exhaust port has a major cross-sectional dimension and the gas exhaust port is spaced apart from the downstream surface of the impeller by a distance of less than about one major cross-sectional dimension.

21. The device of claim 8 wherein the central portion is generally flat.

22. A device for separating a gas from a flow of the gas and particulate matter comprising:

a chamber defined by a receiving surface;

a gas inlet conduit and a gas outlet conduit, the gas inlet conduit being positioned to deliver the flow of the gas and the particulate matter to the chamber, the gas outlet conduit being positioned to exhaust the flow of the gas from the chamber;

an impeller positioned within the chamber and having an upstream surface and a downstream surface, the impeller being configured to deflect the flow of the particulate matter and the gas to a radially outward flow of the particulate matter and the gas in a direction toward the receiving surface of the chamber; and a gas exhaust port positioned in the gas outlet conduit and downstream of the gas inlet conduit and the impeller, wherein the gas inlet conduit includes a major cross-sectional dimension and the chamber has a volume, and the ratio of the major cross-sectional dimension cubed to the volume of the chamber is within the range of from about 1:3 to about 1:14 and wherein the gas exhaust port has a major cross-sectional dimension and the gas exhaust port is spaced apart from the downstream surface of the impeller by a distance of less than about one major cross-sectional dimension.

23. The device of claim 22 wherein the ratio of the major cross-sectional dimension cubed to the volume of the chamber is within the range of from about 1:5 to about 1:10.

24. The device of claim 22 wherein the receiving surface includes a deflector mounted to intercept the particulate matter.

25. The device of claim 24 further comprising an outlet wall having a perimeter, wherein the outlet wall is connected to the receiving surface and the deflector is positioned at an angle of within the range of from about 5 degrees to about 85 degrees with respect to the perimeter of the outlet wall.

26. The device of claim 22 wherein the receiving surface includes a support wall oriented at a first angle with respect to the impeller, wherein the first angle is within the range of from about 45 degrees to about 80 degrees.

27. The device of claim 22 wherein the impeller includes a central portion positioned generally in the center of the impeller.

28. The device of claim 27 wherein the central portion has a major cross-sectional dimension and the gas inlet conduit has a major cross-sectional dimension and the major cross-sectional dimension of the central portion is at least approximately as large as the major cross-sectional dimension of the gas inlet conduit.

29. A device for separating a gas from a flow of the gas and particulate matter comprising:

a chamber defined by a receiving surface;

a gas inlet conduit and a gas outlet conduit, the gas inlet conduit being positioned to deliver the flow of the gas and the particulate matter to the chamber, the gas outlet conduit being positioned to exhaust the flow of the gas from the chamber;

an impeller positioned within the chamber and having an upstream surface and a downstream surface, the impeller being configured to deflect the flow of the particulate matter and the gas to a radially outward flow of the particulate matter and the gas in a direction toward the receiving surface of the chamber; and a gas exhaust port positioned in the gas outlet conduit and downstream of the gas inlet conduit and the impeller, wherein the gas inlet conduit includes a major cross-sectional dimension and the gas inlet conduit has a longitudinal axis, and the chamber has a length in a direction along the longitudinal axis of the gas inlet conduits and the ratio of the major cross-sectional dimension of the gas inlet conduit to the length of the chamber is within the range of from about 2:1 to about 1:3.

30. The device of claim 29 wherein the ratio of the major cross-sectional dimension of the gas inlet conduit to the length of the chamber is within the range of from about 1:1 to about 1:3.

31. The device of claim 29 wherein the gas exhaust port has a major cross-sectional dimension and the gas exhaust port is spaced apart from the downstream surface of the impeller by a distance of less than about one major cross-sectional dimension.

32. The device of claim 29 wherein the gas exhaust port is substantially adjacent the downstream surface of the impeller.

* * * * *